C. AYERS.
Tree-Protectors.
No. 135,685. Patented Feb. 11, 1873.
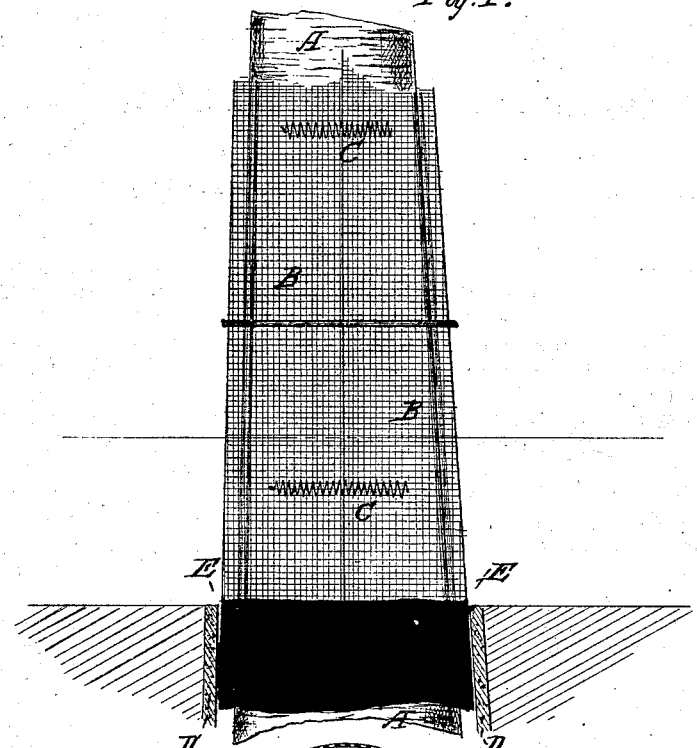
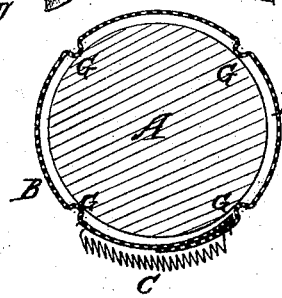
Witnesses:
P. C. Dietrich
C. Sedgwick
Inventor:
C. Ayers
per Munn & Co.
Attorneys.

UNITED STATES PATENT OFFICE.

CHARLES AYERS, OF FARMINGTON CENTRE, WISCONSIN.

IMPROVEMENT IN TREE-PROTECTORS.

Specification forming part of Letters Patent No. 135,685, dated February 11, 1873.

*To all whom it may concern:*

Be it known that I, CHARLES AYERS, of Farmington Centre, in the county of Polk and State of Wisconsin, have invented a new and Improved Tree-Protector, of which the following is a specification:

My invention consists of a wrapper of wire-gauze, tin, zinc, or the like reticulated substance, with ribs to support it a little distance from the tree to admit air, and a coating of tar, printer's ink, or the like, the wrapper being let into the ground a short distance at the roots of the tree and packed around the bottom with wood-ashes. The wrapper is to be large enough to overlap considerably to allow the tree to grow without opening a gap at the edges, and is to be held together by elastic fastenings that will allow it to expand as the tree grows.

This protector is designed to protect the bark against gnawing animals and the boring insects; also the worms which climb and destroy the leaves and branches. It is also a protection against the heat of the sun in early spring and late autumn to that extent that the sap will not be set in action too soon and maintained too long, so as to be frozen in the night, which sometimes happens, greatly to the injury of the tree.

A represents the trunk of a tree; and B, a wrapper of gauze-wire, somewhat larger than the tree, so as to overlap itself to allow it to expand as the tree grows, without opening a gap. C represents spring-fastenings for holding the wrapper snugly and allowing it to expand. This wrapper is provided with ribs G on the inside to rest against the tree and hold the main portion of it a little distance from it to allow a space for the circulation of air. The lower end of this wrapper is sunk a few inches in the ground and packed in wood-ashes, as shown at D, as a means of preventing insects from digging under, the ashes being a preventive against it.

Above the ground for a short distance the wrapper is coated with tar, printer's ink, or other adhesive substance, E, in which the insects will stick fast, to prevent them from crawling up the outside. Above the tar or ink the wire will be painted to protect it from the weather.

Having thus described my invention, I claim as new and desire to secure by Letters Patent—

A wire-gauze wrapper provided with ribs G, as and for the purpose described.

CHARLES AYERS.

Witnesses:
STEPHEN ROWCLIFF,
FRED. A. DRESSER.